(12) United States Patent
Vasters et al.

(10) Patent No.: US 9,473,460 B2
(45) Date of Patent: Oct. 18, 2016

(54) USING HYPERTEXT TRANSFER PROTOCOL AS A TRANSPORT FOR BI-DIRECTIONAL DATA STREAMS

(75) Inventors: Clemens F. Vasters, Kirkland, WA (US); David A. Wortendyke, Seattle, WA (US); Qian Wang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 941 days.

(21) Appl. No.: 12/489,327

(22) Filed: Jun. 22, 2009

(65) Prior Publication Data

US 2010/0325300 A1    Dec. 23, 2010

(51) Int. Cl.
| | | |
|---|---|---|
| G06F 15/16 | (2006.01) | |
| H04L 29/06 | (2006.01) | |
| H04L 29/08 | (2006.01) | |
| H04L 29/14 | (2006.01) | |

(52) U.S. Cl.
CPC ............. *H04L 63/029* (2013.01); *H04L 67/02* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 6,871,213 B1* | 3/2005 | Graham et al. ............... 709/205 |
| 6,934,756 B2 | 8/2005 | Maes | |
| 7,493,383 B1 | 2/2009 | Mukerji | |
| 7,523,186 B1* | 4/2009 | Waters ........................ 709/223 |
| 7,529,840 B2 | 5/2009 | Bocq | |
| 2002/0120760 A1 | 8/2002 | Kimchi et al. | |
| 2003/0172164 A1 | 9/2003 | Coughlin | |
| 2004/0039827 A1* | 2/2004 | Thomas et al. ............... 709/228 |
| 2004/0268150 A1* | 12/2004 | Aaron ........................... 713/201 |
| 2005/0125532 A1 | 6/2005 | Kimchi | |
| 2006/0251101 A1* | 11/2006 | Zhang et al. ................. 370/437 |
| 2007/0130149 A1* | 6/2007 | Kelso et al. .................... 707/10 |
| 2007/0255841 A1* | 11/2007 | Chong ......................... 709/229 |
| 2008/0263148 A1 | 10/2008 | Mace | |
| 2009/0106394 A1* | 4/2009 | Lin ...................... H04L 29/125 709/218 |

FOREIGN PATENT DOCUMENTS

| | | |
|---|---|---|
| CN | 1780219 A | 5/2006 |
| CN | 1801825 A | 7/2006 |
| JP | 2002222124 A | 8/2002 |
| JP | 2006506748 A | 2/2006 |
| JP | 2006-168134 A | 6/2006 |

OTHER PUBLICATIONS

Koyoshi, Tomizuka; Translation of JP-2002-222124; Sep. 8, 2002; whole document.*

(Continued)

*Primary Examiner* — Thomas Dailey
(74) *Attorney, Agent, or Firm* — Nicholas Chen; Fehmi Chebil; Micky Minhas (57) ABSTRACT

The present invention extends to methods, systems, and computer program products for using HyperText Transfer Protocol communication as a transport for bi-directional data streams. Embodiments of the invention facilitate passing otherwise blocked TCP communication through a firewall. Embodiments of the invention can be used to pass legitimate TCP communication through a firewall even though a firewall is configured to block the legitimate TCP communication.

24 Claims, 3 Drawing Sheets

(56) References Cited

OTHER PUBLICATIONS

Hess, Adam, et al., "An Architecture for Secure SOAP Remote Procedure Calls", 2002, 9 pages.
Wolf, Kenny, "Channels 101: Get with the MEP", Apr. 2005, 2 pages.
Mtiihone, "Piggyback Data Transfer Protocol", 2009, 2 pages.
Brennan, Michael, "RE: Binary XML", Jul. 2001, 2 pages.
Hechler, Ferenc, "TCP-Switch Application", Based on information and belief available, at least as early as Jul. 10, 2009, 6 pages.
"First Office Action and Search Report Received in China Patent Application No. 201080027711.8", Mailed Date: Jun. 5, 2014, 11 Pages.
"Office Action Received in Japan Patent Application No. 2012-517667", Mailed Date: Mar. 27, 2014, 9 Pages.
"Second Office Action Received in China Patent Application No. 201080027711.8", Mailed Date: Nov. 28, 2014, 6 Pages.
"Office Action Received in Japan Patent Application No. 2012-517667", Mailed Date: Nov. 7, 2014, 6 Pages.

* cited by examiner

USING HYPERTEXT TRANSFER PROTOCOL AS A TRANSPORT FOR BI-DIRECTIONAL DATA STREAMS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Firewalls are used in many computing environments to regulate communication between protected networks (e.g., a corporate LAN) and unprotected networks (e.g., the Internet). With varied levels of complexity, firewalls can be configured to block a variety of protocols, services, etc. that originate within the protected network and/or the unprotected network. Protocols and services are typically blocked to mitigate the likelihood of malicious activity occurring on the protected network.

However, information technology (IT) personnel tend to error on the side of caution when configuring firewall settings. Thus, many firewalls are configured to place significant restrictions on the types of communication that can pass through the firewall between a protected and unprotected network. For example, IT personnel may set the strictest possible restrictions on a network simply to increase security to its fullest extent. However, IT personnel often fail to consider with an appropriate level of granularity the types of legitimate communication that may be needed. Accordingly, it is not uncommon for one or more types of legitimate communication to be blocked by a firewall.

BRIEF SUMMARY

The present invention extends to methods, systems, and computer program products using HyperText Transfer protocol ("HTTP") as a transport protocol for bi-directional data streams. In some embodiments, the characteristics of the bi-directional data stream closely approximate those of a bi-directional data stream established with the Transmission Control Protocol ("TCP"). A computer system attempts to communicate with another computer system using TCP communication. The computer system receives an indication that a firewall blocked the TCP communication. The computer system sends HTTP communication through the firewall to the other computer system in response to the firewall blocking the TCP communication.

The other computer system receives the HTTP communication through a firewall from the computer system. The other computer system sends an upstream URI and a downstream URI to the computer system in response to the HTTP communication. The computer system receives the upstream URI and the downstream URI from the other computer system.

A bi-directional datasocket (e.g., closely approximating a TCP socket) is simulated through HTTP communication. The computer system sends an HTTP request to send data to the upstream URI and sends an HTTP request to receive data from the downstream URI to the other computer system. The other computer system receives the HTTP request to send data to the upstream URI and receives the HTTP request to receive data from the downstream URI from the computer system. The HTTP request to send data and the HTTP request to receive data are bound together into a bi-directional data stream (e.g., having characteristics similar to a TCP bi-directional data stream) between the computer system and the other computer system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for using HyperText Transfer protocol communication ("HTTP") as a transport for bi-directional data streams. In some embodiments, the characteristics of the bi-directional data stream closely approximate those of a bi-directional data stream established with the Transmission Control Protocol ("TCP"). A computer system attempts to communicate with another computer system using TCP communication. The computer system receives an indication that a firewall blocked the TCP communication. The computer system sends HTTP communication through the firewall to the other computer system in response to the firewall blocking the TCP communication.

The other computer system receives the HTTP communication through a firewall from the computer system. The other computer system sends an upstream URI and a downstream URI to the computer system in response to the HTTP communication. The computer system receives the upstream URI and the downstream URI from the other computer system.

A bi-directional data socket (e.g., closely approximating a TCP socket) is simulated through HTTP communication. The computer system sends an HTTP request to send data to the upstream URI and sends an HTTP request to receive data from the downstream URI to the other computer system. The other computer system receives the HTTP request to send data to the upstream URI and receives the HTTP request to receive data from the downstream URI from the computer system. The HTTP request to send data and the HTTP request to receive data are bound together into a bi-directional data stream (e.g., having characteristics similar to a TCP bi-directional data stream) between the computer system and the other computer system.

Accordingly, the computer system uses the upstream URI to send communication through the firewall to the other computer system. Likewise, the other computer system uses the upstream URI to receive communication through the firewall from the computer system. The computer system uses the downstream URI to receive communication through the firewall from the other computer system. Likewise, the other computer system uses the downstream URI to send communication through the firewall to the computer system. Modules at each computer system can be used to control data rates of HTTP requests and keep HTTP requests continuously alive.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Within this description and the following claims, "HTTP communication" is defined as communication that uses one or more of the HyperText Transfer Protocol ("HTTP") and HyperText Transfer Protocol Secure ("HTTPS").

Within this description and the following claims, "HTTP requests" are defined as a request that uses one or more of HTTP and HTTPS.

Within this description and the following claims, "TCP-like" is defined as exhibiting characteristics very similar to Transmission Control Protocol ("TCP") without actually being TCP.

Within this description and the following claims, "TCP-equivalent" is defined as exhibiting characteristics equivalent to Transmission Control Protocol ("TCP") without actually being TCP.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
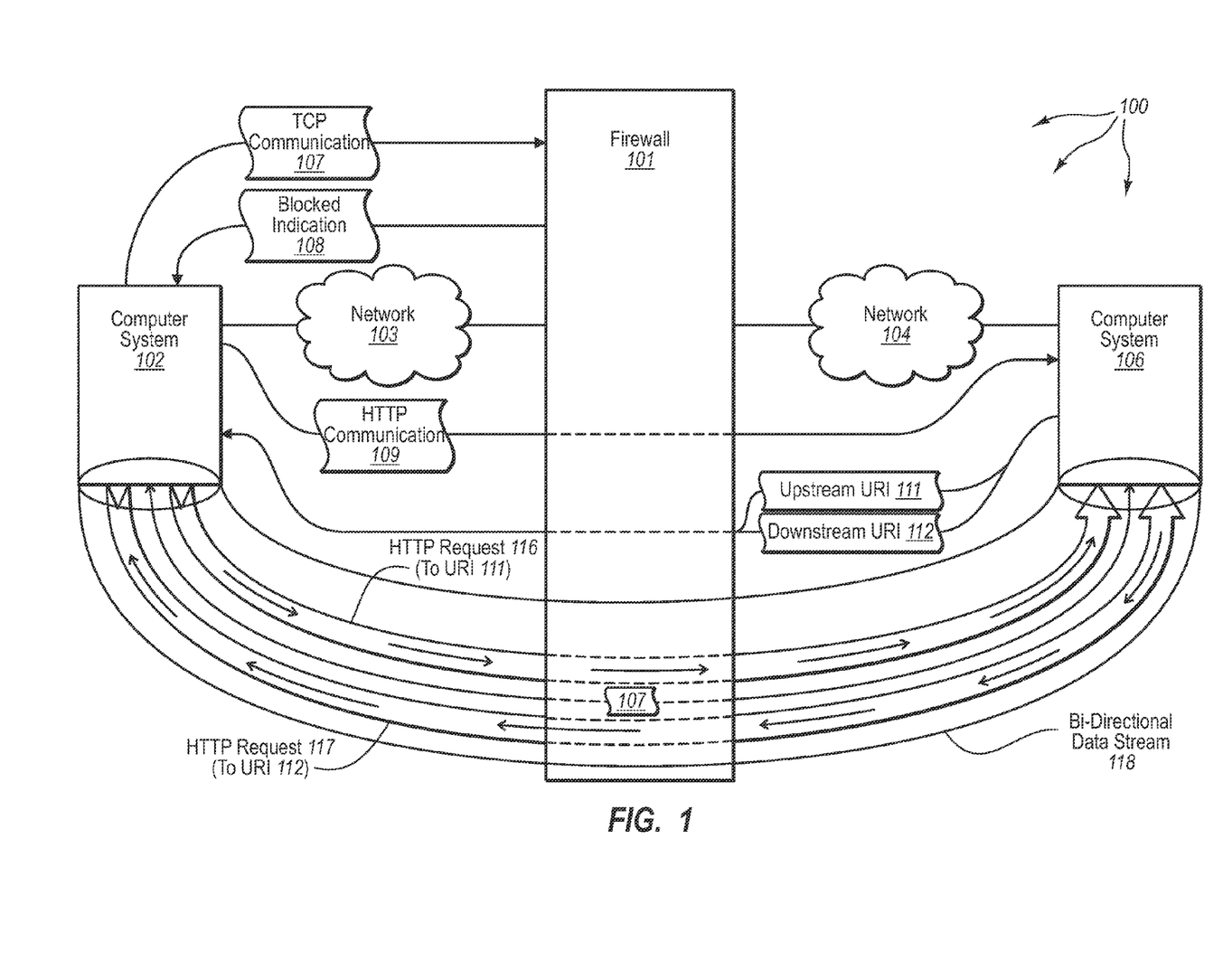
FIG. 1 illustrates an example computer architecture that facilitates using HyperText Transfer Protocol ("HTTP") communication as a transport for a bi-directional data stream.

FIG. 1 illustrates an example computer architecture 100 that facilitates using HTTP or HTTPS communication as a transport for a bi-directional data stream. In some embodiments, the characteristics of the bi-directional data stream closely approximate those of a bi-directional data stream established with the Transmission Control Protocol ("TCP").

Referring to FIG. 1, computer architecture 100 includes computer system 102, network 103, firewall 101, network 104, and computer system 106. Thus, each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, User Datagram Protocol ("UDP"), TCP, HTTP, HTTPS, Simple Mail Transfer Protocol ("SMTP"), etc.) over the network.

Generally, firewall 101 can be an edge device between network 103 (e.g., a corporate LAN) and network 104 (e.g., the Internet). Firewall 101 can be configured in accordance with rules to block specified types of communication from entering and leaving network 103. For example, firewall 101 can be configured to prevent TCP communication from passing from network 103 to 104. Firewall 101 can be configured to block all TCP communication or can block TCP communication through specified ports that are configured for TCP (e.g., as indicated in the official list of port numbers maintained by the Internet Assigned Numbers Authority "IANA").

Thus, firewall 101 prevents at least some TCP communication originating on network 103 from passing through to network 104. For example, firewall 101 is configured to block at least some TCP communication sent from computer system 102 to computer system 106. Firewall 101 can block TCP communication in an attempt to protect network 103 from interacting with specific services (corresponding to specified port numbers) on network 104 that are undesirable. For example, firewall 101 can prevent computer systems a corporate LAN from participating in peer-to-peer file sharing networks on in the Internet.

On the other hand, firewall 101 can be configured to generally permit HTTP communication (e.g., using TCP as a transport) originating on network 103 to pass through to network 104. Permitting HTTP communication to pass through firewall 101 allows computer systems on network 103 to participate in a variety of (potentially more controlled) computing activities with computer systems on network 104. For example, computer system 102 can utilize HTTP communication to browse the World Wide Web ("WWW"). Permitting HTTP communication can include permitting communication through port 80 (HTTP) and/or port 443 (HTTPS).

Both of computer systems 102 and 106 can include modules for continuously keeping HTTP requests alive, throttling data flow on HTTP requests, and binding a combination of HTTP requests into a bi-directional datastream. A bi-directional data stream can be a TCP-like bi-directional data stream that closely approximates characteristics of a bi-directional data stream established with TCP. A bi-directional data stream can even be a TCP-equivalent data stream that has characteristics equivalent to a bi-directional data stream established with TCP.

Figure 3:
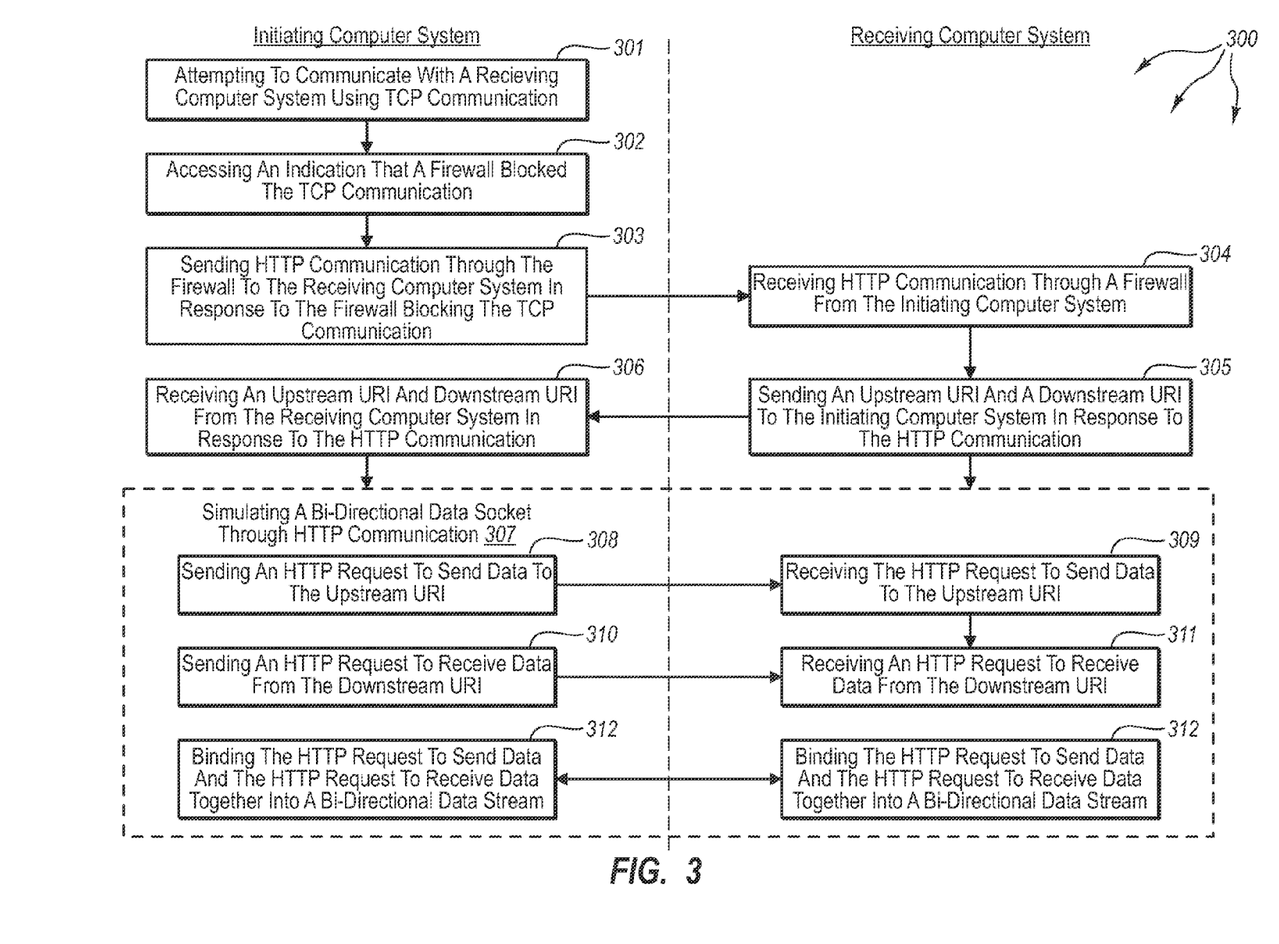
FIG. 3 illustrates a flow chart of an example method for using HTTP communication as a transport for a bi-directional data stream.

FIG. 3 illustrates a flow chart of an example method 300 for using HTTP communication as a transport for a bi-directional data stream. Method 300 will be described with respect to the components and data of computer architecture 100.

Method 300 includes an act of attempting to communicate with another computer system using TCP communication (act 301). For example, computer system 102 can attempt send TCP communication 107 to computer system 106. TCP communication 107 represents electronic communication that uses TCP and is sent to a specified port. Specified ports can represent higher layer protocols, such as, for example, File Transfer Protocol ("FTP"), SMTP, Telnet, Real-time Transport Protocol ("RTP"), that use TCP as a transport protocol. HTTP can also potentially use TCP as a transport. Thus, it may be that TCP communication 107 is HTTP over TCP. When that occurs, it is can also be considered TCP communication.

Firewall 101 can receive TCP communication 107. As previously described, firewall 101 can be configured to block TCP communication in general or on specified ports. In either event, firewall 101 blocks TCP communication 107. For example, firewall 101 can block a file transfer request to a peer-to-peer file sharing network. It may be that firewall 101 is configured to block HTTP communication over TCP but permit HTTP communication over UDP to pass through. Thus, it is possible that if TCP communication 107 is HTTP communication over TCP this HTTP communication is blocked. However, it may also be that firewall 101 is configured to permit HTTP communication over TCP to pass through even if TCP communication is blocked on other ports. As such, HTTP communication over TCP or HTTP communication over UDP can both pass through firewall 101.

In response to blocking TCP communication 107, firewall 101 can send blocked indication 108 back to computer system 102. Method 300 includes an act of accessing an indication that a firewall blocked the TCP communication (act 302). For example, computer system 101 can receive blocked indication 108.

Method 300 includes an act of sending HTTP communication through the firewall to the other computer system in response to the firewall blocking the TCP communication (act 303). For example, computer system 102 can send HTTP communication 109 to computer system 106. Firewall 101 can receive HTTP communication 109. Firewall 101 can allow HTTP communication 109 (over UDP or TCP) to pass through to network 104.

Method 300 includes an act of receiving HTTP communication through a firewall from the initiating computer system (act 304). For example, computer system 106 can receive HTTP communication 109 from computer system 101.

Method 300 includes an act of sending an upstream URI and a downstream URI the initiating computer system in response to the HTTP communication (act 305). For example, computer system 106 can send upstream URI 111 and downstream URI 112 to computer system 102 in reply to HTTP communication 109. URIs 111 and 112 can identify modules at computer system 106 that are configured to continuously keeping HTTP requests alive and bind a combination of HTTP requests into a bi-directional data stream. In some embodiments, the bi-directional data stream is a TCP-like or TCP-equivalent bi-directional data stream.

Firewall 101 can receive URIs 111 and 112. Since URIs 111 and 112 represent a represent a reply to HTTP communication 109, firewall 101 allows URIs 111 and 112 to pass through to network 103.

Method 300 includes an act of receiving an upstream URI and downstream URI from the receiving computer system in response to the HTTP communication (act 306). For example, computer system 102 can receive upstream URI 111 and downstream URI 112 from computer system 106. Modules at computer system 102 that are configured to continuously keep HTTP requests alive and bind a combination of HTTP requests into a bi-directional data stream can use URIs 111 and 112 to communicate with corresponding modules at computer system 106.

Method 300 includes an act of simulating a bi-directional datasocket through HTTP communication (act 307). For example, computer systems 102 and 106 can simulate a bi-directional data socket through communication of HTTP request 116 and HTTP request 117. In some embodiments, the bi-directional data socket is a TCP-like bi-directional data socket or TCP-equivalent bi-directional data socket.

Simulating a bi-directional data socket through HTTP includes an act of sending an HTTP request to send data to the upstream URI (act 308). For example, computer system 101 can send HTTP request 116, such as, for example, a HTTP POST, PUT, or other equivalent request to upstream URI 111. Simulating a bi-directional datasocket through HTTP includes an act of receiving the HTTP request to send data to the upstream URI (act 309). For example, computer system 106 can receive HTTP request 116 directed to upstream URI 111. Computer system 102 can continuously keep HTTP request 116 alive by intermittently sending a small amount of data over HTTP request 116.

Simulating a bi-directional data socket through HTTP includes an act of sending an HTTP request to receive data from the downstream URI (act 310). For example, computer system 101 can send HTTP request 117, such as, for example, a HTTP GET or other equivalent request to downstream URI 112. Simulating a bi-directional data socket through HTTP includes an act of receiving the HTTP request to receive data from the downstream URI (act 311). For example, computer system 106 can receive HTTP request 117 directed to downstream URI 112. Computer system 102 can continuously keep HTTP request 117 alive by intermittently receiving a small amount of data over HTTP request 117.

Simulating a bi-directional data socket through HTTP communication includes an act of binding the HTTP request to send data and the HTTP request to receive data together into a bi-directional data stream between the computer system and the other computer system (act 312). For example, computer systems 102 and 106 can bind HTTP request 116 and HTTP 117 together into bi-directional data stream 118. The characteristics of bi-directional data stream 118 can closely approximate those of a bi-directional data stream established with TCP. For example, bi-directional data stream 118 can be a TCP-like bi-directional data stream or a TCP-equivalent bi-directional data stream.

Subsequently, TCP communication 107 can be sent through firewall 101 using bi-directional data stream 118. Since TCP communication 107 is travelling on top of HTTP, firewall 101 views TCP communication 107 as HTTP communication and does not block TCP communication 107. Modules at computer system 102 and 106 can interoperate to provide appropriate TCP protocol characteristics over bi-directional datastream 118. Some TCP protocol characteristics can be provided by keeping the HTTP requests alive and throttling data flow over the HTTP requests.

Figure 2:
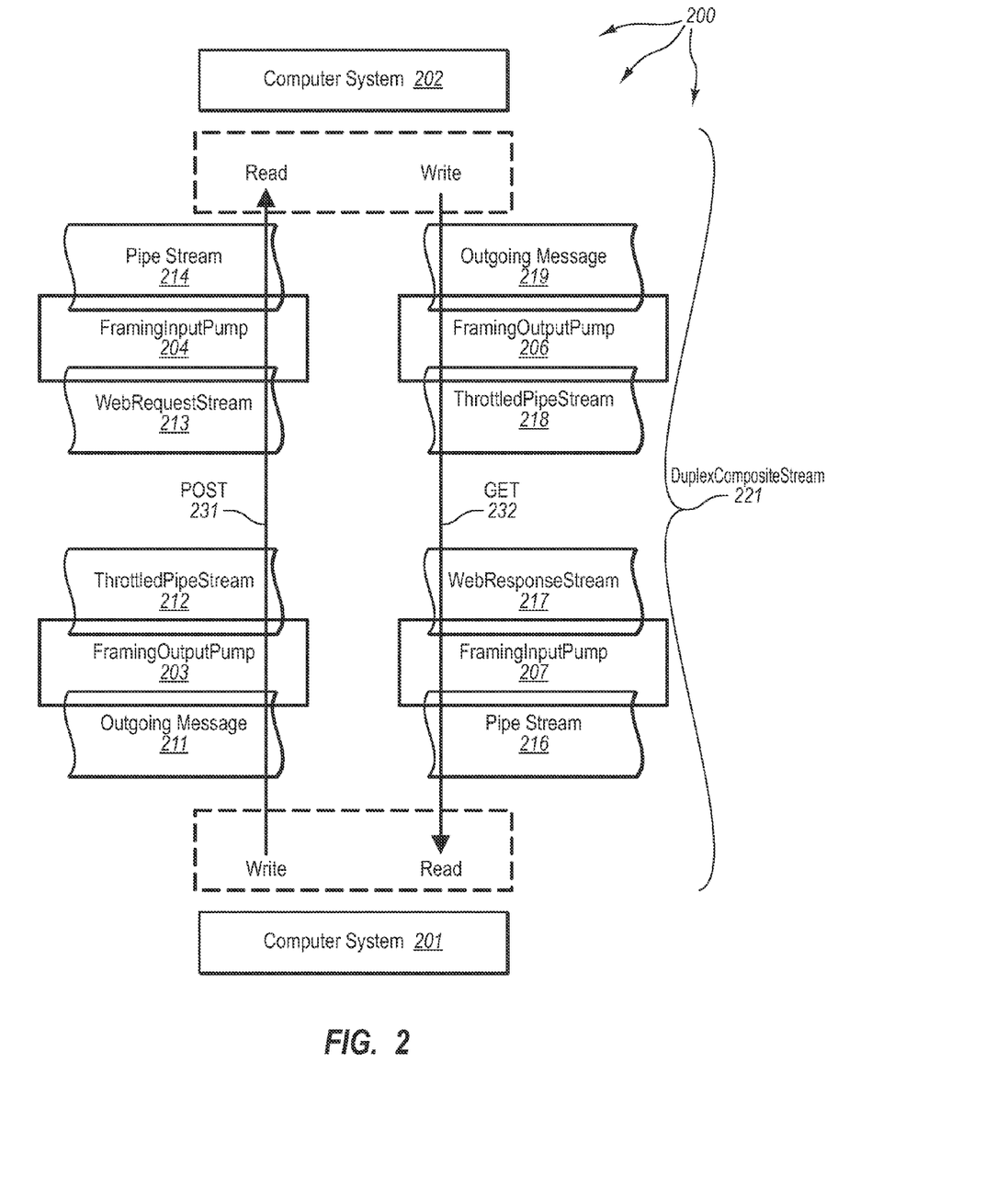
FIG. 2 illustrates a example computer architecture that facilitates throttling data flow and keep HTTP requests alive when HTTP communication is used as a transport for communication over a bi-directional data stream.

As previously described, both of computer systems 102 and 106 can include modules for continuously keeping HTTP requests alive, throttling data flow, and binding a combination of HTTP requests into a bi-directional TCP stream. FIG. 2 illustrates an example computer architecture 200 that facilitates throttling data flow and keep HTTP requests alive when using HTTP communication as a transport for TCP communication.

As depicted, HTTP POST 231 and HTTP GET 232 are used to establish duplex composite stream 221 between computer systems 201 and 202. HTTP POST 231 is used to write data from computer system 201 for reading at computer system. On the other hand, HTTP GET 232 is used to write data form computer system 202 for reading at computer system 201.

Upon writing HTTP data from computer system 201 to computer system 202 over HTTP POST 231, computer system 201 writes a block of bytes into outgoing message 211 (e.g., a frame). Outgoing message 211 is then forwarded to framing output pump 203. Since HTTP hides the underlying TCP flow control, there is a need to provide flow control over the HTTP abstraction. Framing output pump 203 controls the data rate of HTTP data to convert outgoing message 211 into throttled pipe stream 212.

In some embodiments, framing output pump 203 is configured to map multiple write operations from upstream into a frame if they occur within a specified duration, such as, for example, some number of milliseconds. Framing output pump 203 may therefore accept multiple outgoing messages and form a frame that's then handed to throttled pipe stream 212. Throttled pipe stream 212 allows the delivery of these preassembled frames into the outgoing HTTP stream at a rate that's decoupled from the upstream writes. However, throttled pipe stream 212 can block accepting more frames once the TCP flow control underlying HTTP starts back-pressuring into the pump that pushes the data onto the network. When the congestion eases, the data will be pushed out of throttled pipe stream 212 at a higher rate which, in turn, unblocks the framing pump above it.

A buffer pump can be situated between framing output pump 203 and framing input pump 204. The buffer pump is configured to move blocks of bytes from one stream to the next. For example, the buffer pump can flush data from throttled pipe stream 212 (e.g., over a network) out to Web request stream 213. Web request stream 213 is forwarded to framing input pump 204. Framing input pump 204 converts incoming Web request stream 213 into pipe stream 214 for delivery to computer system 202.

Similarly, upon writing HTTP data from computer system 202 to computer system 201 over HTTP GET 232, computer system 202 writes a block of bytes into outgoing message 219 (e.g., a frame). Outgoing message 219 is then forwarded to framing output pump 206. Since HTTP hides the underlying TCP flow control, there is a need to provide flow control over the HTTP abstraction. Framing output pump 206 controls the data rate of HTTP data to convert outgoing message 219 into throttled pipe stream 218.

A buffer pump can be situated between framing output pump 206 and framing input pump 207. The buffer pump is configured to move blocks of bytes from one stream to the next. For example, the buffer pump can flush data from throttled pipe stream 218 (e.g., over a network) out to Web response stream 217. Web response stream 217 is forwarded to framing input pump 207. Framing input pump 207 converts incoming Web response stream 217 into pipe stream 216 for delivery to computer system 201.

One or more of the framing output pump 203 and framing input pump 204 can be configured to send small amounts of data over HTTP POST 231 when other data is not detected for a specified period time. The specified period of time can be set to less than an HTTP request timeout time. As such, sending the small amount of data can be used to simulate the transfer of data from computer system 201 to computer system 202. Thus, HTTP POST 231 appears active to intermediaries even when computer system 201 is not actually writing data to HTTP POST 231. Accordingly, the intermediaries are likely to continue to allocate resources to keep HTTP POST 231 alive.

Similarly, one or more of the framing output pump 206 and framing input pump 206 can be configured to send small amounts of data over HTTP GET 232 when other data is not detected for a specified period time. The specified period of time can be set to less than an HTTP request timeout time. As such, sending the small amount of data can be used to simulate the transfer of data from computer system 201 to computer system 202. Thus, HTTP GET 232 appears active to intermediaries even when computer system 202 is not actually writing data to HTTP GET 232. Accordingly, the intermediaries are likely to continue to allocate resources to keep HTTP POST 232 alive.

Embodiments of the invention facilitate passing otherwise blocked TCP communication through a firewall. Embodiments of the invention can be used to pass legitimate TCP communication outside a firewall even though the firewall is configured to block the legitimate TCP communication. For example, a technician on a service call may be able to access documentation on a remote Web site using a service that is otherwise blocked by a corporate firewall.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including one or more processors and system memory, a method for using an application layer protocol as a transport for a bi-directional data stream, the method comprising:

attempting to initiate establishment of a transport layer communications session with another computer system using a transport layer protocol, including:

sending a transport layer communication to a specified port on the other computer system using a transport layer protocol for exchanging particular data with the other computer system; and subsequent to sending the transport layer communication, receiving an indication that a firewall blocked the transport-layer communication to the specified port on the other computer system; and subsequent to, and in response to, the firewall blocking the transport layer communication, initiating establishment of an application-layer communications session with the other computer system using an application-layer communication mode that simulates a transport-layer bi-directional data socket in an application layer to exchange the particular data with the other computer system, including:

sending an application-layer communication through the firewall to the other computer system using an application layer protocol;

in response to sending the application-layer communication, receiving an upstream identifier from the other computer system that identifies a first computing resource on the other computing system to which the computer system is to send requests to send data to the other computing system, and receiving a downstream identifier from the other computer system that identifies a second computing resource on the other computing system to which the computer system is to send requests to receive data from the other computer system, wherein the upstream and downstream identifiers are received using the application layer protocol;

based at least on receiving the upstream identifier, establishing a first single-directional data stream with the other computer system using the application layer protocol, including sending a single-directional request to send first data to the first computing system resource corresponding to the upstream identifier;

based at least on receiving the downstream identifier, establishing a second single-directional data stream with the other computer system using the application layer protocol, including sending a single-directional request to receive second data from the second computing system resource corresponding to the downstream identifier; and simulating the transport-layer bi-directional data socket using the first and second single-directional data streams in the application layer protocol, including binding the first data stream and the second data stream to both send the first data to the other computer system and receive the second data from the other computer system using the application layer protocol.

2. The method as recited in claim 1, wherein sending the transport layer communication comprises sending the transport layer communication to a specified port to attempt to communicate with a service that uses the specified port.

3. The method as recited in claim 1, wherein the application layer protocol comprises the hypertext transfer protocol (HTTP).

4. The method as recited in claim 1, wherein the transport layer protocol comprises the transmission control protocol (TCP).

5. The method as recited in claim 1, wherein binding the first data stream and the second data stream to both send the first data to the other computer system and receive the second data from the other computer system using the application layer protocol comprises continuously keeping each data stream alive by sending a small amount of data at a specified time interval, the small amount of data appearing to intermediaries to be data sent from the computer system using an application layer protocol.

6. The method as recited in claim 1, further comprising resending the transport layer communication through the firewall to other computer system over the bi-directional data stream.

7. At a computer system, the computer system including one or more processors and system memory, a method for using an application layer protocol as a transport for a bi-directional data stream, the method comprising:

receiving an application-layer communication sent via an application layer protocol through a firewall from another computer system, the application-layer communication having been sent by the other computer system based on the other computer system having first attempted to establish a transport layer communications session but having had the firewall block the attempt to establish the transport layer communications session, and based on the other computer system having subsequently established an application-layer communications session with the computer system using an application-layer communication mode that simulates a transport-layer bi-directional data socket in an application layer to exchange particular data in response to the firewall having blocked the attempt by the other computer system to establish the transport layer communications session;

in response to receiving the application-layer communication, sending an upstream identifier and a downstream identifier to the other computer system, the upstream identifier identifying a first computing resource on the computer system to which the other computer system sends requests to send data to the computer system and the downstream identifier identifying a second computing resource on the other computer system to which the computer system sends requests to receive data from the other computer system, wherein the upstream and downstream identifiers are sent using the application layer protocol; and simulating the transport-layer bi-directional data socket using two or more single-directional data streams in the application layer protocol, including:
  receiving, in a first data stream using the application layer protocol, a single-directional request from the other computer system, the single-directional request for the other computer system to send first data to the first computing system resource corresponding to the upstream identifier;
  receiving, in a second data stream using the application layer protocol, a single-directional request from the other computer system, the single-directional request for the other computer system to receive second data from the second computing system resource corresponding to the downstream identifier; and
  binding the first data stream and the second data stream to both send the first data to the other computer system and receive the second data from the other computer system using the application layer protocol as part of exchanging the particular data with the other computer system.

8. The method as recited in claim 7, wherein receiving the request to send the first data to the first computing system resource corresponding to the upstream identifier comprises receiving one of an HTTP PUT and an HTTP POST.

9. The method as recited in claim 7, wherein receiving the request to receive the second data from the second computing system resource corresponding to the downstream identifier comprises receiving an HTTP GET.

10. The method as recited in claim 7, wherein binding the first data stream and the second data stream to both send the first data to the other computer system and receive the second data from the other computer system using the application layer protocol continuously keeping each data stream alive by sending a small amount of data at a specified time interval, the small amount of data appearing to intermediaries to be data sent from the other computer system.

11. A computer system, comprising:
  one or more processors; and
  one or more hardware storage devices having stored thereon computer-executable instructions that, when executed by the one or more processors, cause the computer system to use an application layer protocol as a transport for a bi-directional data stream, including the following:
    attempting to initiate establishment of a transport layer communications session with another computer system using a transport layer protocol, including:
      sending a transport-layer communication to a specified port on the other computer system using a transport layer protocol for exchanging particular data with the other computer system; and
      subsequent to sending the transport layer communication, receiving an indication that a firewall blocked the transport-layer communication to the specified port on the other computer system; and
    subsequent to, and in response to, the firewall blocking the transport-layer communication, initiating establishment of an application-layer communications session with the other computer system using an application-layer communication mode that simulates a transport-layer bi-directional data socket in an application layer to exchange the particular data with the other computer system, including:
      sending an application-layer communication through the firewall to the other computer system using an application layer protocol;
      in response to sending the application-layer communication, receiving an upstream identifier from the other computer system that identifies a first computing resource on the other computing system to which the computer system is to send requests to send data to the other computing system, and receiving a downstream identifier from the other computer system that identifies a second computing resource on the other computing system to which the computer system is to send requests to receive data from the other computer system, wherein the upstream and downstream identifiers are received using the application layer protocol;
      based at least on receiving the upstream identifier, establishing a first single-directional data stream with the other computer system using the application layer protocol, including sending a single-directional request to send first data to the first computing system resource corresponding to the upstream identifier;
      based at least on receiving the downstream identifier, establishing a second single-directional data stream with the other computer system using the application layer protocol, including sending a single-directional request to receive second data from the second computing system resource corresponding to the downstream identifier; and
      simulating the transport-layer bi-directional data socket using the first and second single-directional data streams in the application layer protocol, including binding the first data stream and the second data stream to both send the first data to the other computer system and receive the second data from the other computer system using the application layer protocol.

12. The computer system as recited in claim 11, wherein sending the transport-layer communication comprises sending the transport-layer communication to a specified port to attempt to communicate with a service that uses the specified port.

13. The computer system as recited in claim 11, wherein simulating the bi-directional data socket comprises simulating a bi-directional data socket that has characteristics emulating a transport layer protocol socket.

14. One or more hardware storage devices having stored thereon computer-executable instructions that, when executed by one or more processors of a computer system, cause the computer system to use an application layer protocol as a transport for a bi-directional data stream, including the following:
    attempting to initiate establishment of a transport layer communications session with another computer system using a transport layer protocol, including:
        sending a transport-layer communication to a specified port on the other computer system using a transport layer protocol for exchanging particular data with the other computer system; and
        subsequent to, sending the transport layer communication, receiving an indication that a firewall blocked the transport-layer communication to the specified port on the other computer system; and
    subsequent to, and in response to, the firewall blocking the transport-layer communication, initiating establishment of an application-layer communications session with the other computer system using an application-layer communication mode that simulates a transport-layer bi-directional data socket in an application layer to exchange the particular data with the other computer system, including:
        sending an application-layer communication through the firewall to the other computer system using an application layer protocol;
        in response to sending the application-layer communication, receiving an upstream identifier from the other computer system that identifies a first computing resource on the other computing system to which the computer system is to send requests to send data to the other computing system, and receiving a downstream identifier from the other computer system that identifies a second computing resource on the other computing system to which the computer system is to send requests to receive data from the other computer system, wherein the upstream and downstream identifiers are received using the application layer protocol;
        based at least on receiving the upstream identifier, establishing a first single-directional data stream with the other computer system using the application layer protocol, including sending a single-directional request to send first data to the first computing system resource corresponding to the upstream identifier;
        based at least on receiving the downstream identifier, establishing a second single-directional data stream with the other computer system using the application layer protocol, including sending a single-directional request to receive second data from the second computing system resource corresponding to the downstream identifier; and
        simulating the transport-layer bi-directional data socket using the first and second single-directional data streams in the application layer protocol, including binding the first data stream and the second data stream to both send the first data to the other computer system and receive the second data from the other computer system using the application layer protocol.

15. The one or more hardware storage devices as recited in claim 14, wherein sending the transport-layer communication comprises sending the transport-layer communication to a specified port to attempt to communicate with a service that uses the specified port.

16. The one or more hardware storage devices as recited in claim 14, wherein simulating the bi-directional data socket comprises simulating a bi-directional data socket that has characteristics emulating a transport layer protocol socket.

17. A computer system, comprising:
    one or more processors; and
    one or more hardware storage devices having stored thereon computer-executable instructions that, when executed by the one or more processors, cause the computer system to use an application layer protocol as a transport for a bi-directional data stream, including the following:
        receiving an application-layer communication sent via an application layer protocol through a firewall from another computer system, the application-layer communication having been sent by the other computer system based on the other computer system having first attempted to establish a transport layer communications session but having had the firewall block the attempt to establish the transport layer communications session, and based on the other computer system having subsequently established an application-layer communications session with the computer system using an application-layer communication mode that simulates a transport-layer bi-directional data socket in an application layer to exchange particular data in response to the firewall having blocked the attempt by the other computer system to establish the transport layer communications session;
        in response to receiving the application-layer communication, sending an upstream identifier and a downstream identifier to the other computer system, the upstream identifier identifying a first computing resource on the computer system to which the other computer system sends requests to send data to the computer system and the downstream identifier identifying a second computing resource on the other computer system to which the computer system sends requests to receive data from the other computer system, wherein the upstream and downstream identifiers are sent using the application layer protocol; and
        simulating the transport-layer bi-directional data socket using two or more single- directional data streams in the application layer protocol, including:
        receiving, in a first data stream using the application layer protocol, a single-directional request from the other computer system, the single-directional request for the other computer system to send first data to the first computing system resource corresponding to the upstream identifier;
        receiving, in a second data stream using the application layer protocol, a single-directional request from the other computer system, the single-directional request for the other computer system to receive second data from the second computing system resource corresponding to the downstream identifier; and
        binding the first data stream and the second data stream to both send the first data to the other computer system and receive the second data from the other computer system using the application layer protocol as part of exchanging the particular data with the other computer system.

18. The computer system as recited in claim 17, wherein receiving the request to send the first data to the first computing system resource corresponding to the upstream identifier comprises receiving one of an HTTP PUT and an HTTP POST, and wherein receiving the request to receive the second data from the second computing system resource corresponding to the downstream identifier comprises receiving an HTTP GET.

19. The computer system as recited in claim 17, wherein simulating the bi-directional data socket comprises emulating characteristics of a transport layer protocol socket.

20. One or more hardware storage devices having stored thereon computer-executable instructions that, when executed by one or more processors of a computer system, cause the computer system to use an application layer protocol as a transport for a bi-directional data stream, including the following:
  receiving an application-layer communication sent via an application layer protocol through a firewall from another computer system, the application-layer communication having been sent by the other computer system based on the other computer system having first attempted to establish a transport layer communications session but having had the firewall block the attempt to establish the transport layer communications session, and based on the other computer system having subsequently established an application-layer communications session with the computer system using an application-layer communication mode that simulates a transport-layer bi-directional data socket in an application layer to exchange particular data with in response to the firewall having blocked the attempt by the other computer system to establish the transport layer communications session;
  in response to receiving the application-layer communication, sending an upstream identifier and a downstream identifier to the other computer system, the upstream identifier identifying a first computing resource on the computer system to which the other computer system sends requests to send data to the computer system and the downstream identifier identifying a second computing resource on the other computer system to which the computer system sends requests to receive data from the other computer system, wherein the upstream and downstream identifiers are sent using the application layer protocol; and
  simulating the transport-layer bi-directional data socket using two or more single-directional data streams in the application layer protocol, including:
    receiving, in a first data stream using the application layer protocol, a single-directional request from the other computer system, the single-directional request for the other computer system to send first data to the first computing system resource corresponding to the upstream identifier;
    receiving, in a second data stream using the application layer protocol, a single-directional request from the other computer system, the single-directional request for the other computer system to receive second data from the second computing system resource corresponding to the downstream identifier; and
    binding the first data stream and the second data stream to both send the first data to the other computer system and receive the second data from the other computer system using the application layer protocol as part of exchanging the particular data with the other computer system.

21. The one or more hardware storage devices as recited in claim 20, wherein receiving the request to send the first data to the first computing system resource corresponding to the upstream identifier comprises receiving one of an HTTP PUT and an HTTP POST, and wherein receiving the request to receive the second data from the second computing system resource corresponding to the downstream identifier comprises receiving an HTTP GET.

22. The one or more hardware storage devices as recited in claim 20, wherein simulating the bi-directional data socket comprises emulating characteristics of a transport layer protocol socket.

23. The method as recited in claim 1, further comprising:
  regulating a rate with which data is sent to the other computer system using the simulated transport-layer bi-directional data socket, including:
    an output pump mapping a plurality of write operations into a single data frame when the plurality of write operations occur within a predefined duration; and
    a throttled pipe stream delivering data frames generated by the output pump at a rate that is decoupled from writes to the output pump.

24. The method as recited in claim 7, further comprising:
  regulating a rate with which data is sent to the other computer system using the simulated transport-layer bi-directional data socket, including:
    an output pump mapping a plurality of write operations into a single data frame when the plurality of write operations occur within a predefined duration; and
    a throttled pipe stream delivering data frames generated by the output pump at a rate that is decoupled from writes to the output pump.

* * * * *